UNITED STATES PATENT OFFICE.

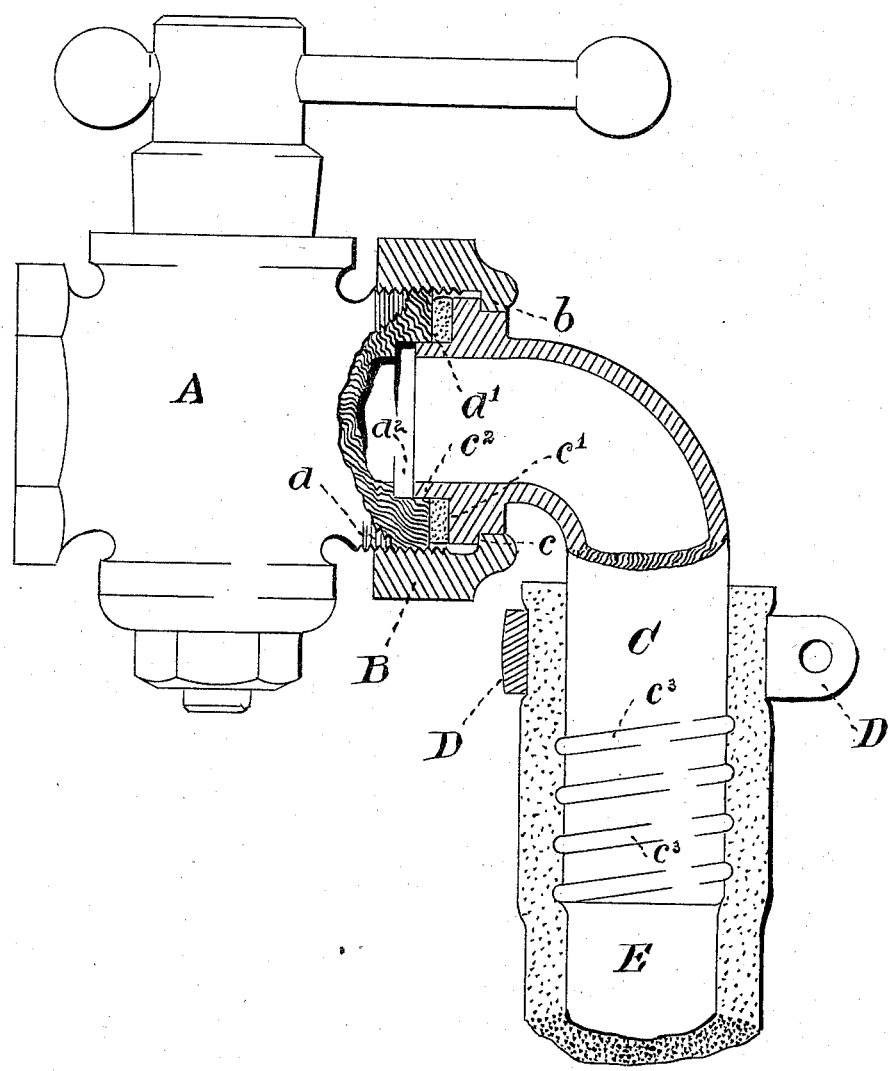

PATRICK HENRY REARDON, OF SAN FRANCISCO, CALIFORNIA.

HOSE-ATTACHING DEVICE FOR ROCK-DRILLS.

SPECIFICATION forming part of Letters Patent No. 607,955, dated July 26, 1898.

Application filed April 28, 1897. Serial No. 634,267. (No model.)

*To all whom it may concern:*

Be it known that I, PATRICK HENRY REARDON, a citizen of the United States, residing in the city and county of San Francisco and State of California, have invented an Improved Hose-Attaching Device for Rock-Drills, of which the following is a specification.

My invention relates to the class of devices for connecting flexible pipes or hose to engine rock-drills and other similar situations where the hose and its connections are subjected to extreme hard usage.

It consists in the novel construction, arrangement, and combination of the several parts, which I shall hereinafter fully describe and specifically claim.

The object of this invention is to provide a simple device of the above character adapted to facilitate its attachment to the hose and also the attachment of the hose to the rock-drill engine and to so arrange its construction that the customary kinking and consequent breaking of the hose are prevented.

A further object is to so arrange the device that the hose may be disconnected from the drill-engine without the necessity of shutting off the compressed air at its source.

I accomplish these objects by means of the devices illustrated in the accompanying drawing, in which the view shows an elevation of the device, partly in section to more clearly illustrate it.

Referring to the drawing, A is a stop-cock provided with suitable means whereby it is attached to the inlet of the engine-drill. The other end of A is provided with an externally-threaded or male end $a$, having an end seat $a'$. It is also provided with a recess or counterbore $a^2$.

B is a coupling-ring threaded internally and having an inwardly-projecting flange $b$.

C represents a bent detachable nozzle or spout of the stop-cock. Its inner end is provided with a flange $c$, adapted to engage with flange $b$ of the coupling-ring. The end face of flange $c$ forms a seat $c'$, corresponding and opposing seat $a'$ of the end A. Between these two seats a suitable packing-ring is clamped. An unthreaded annular projection $c^2$ is provided, adapted to engage with and fit snugly into the recess or counterbore $a^2$.

The nozzle C is curved or bent, as shown. It is of cylindrical form, and a portion of its length, commencing with its outer end, is provided with a round or non-angular thread raised above its surface.

A clamp D is provided, adapted to encircle the hose E and compress it upon the unthreaded portion of the nozzle intermediate of the threads and inner end of C.

The operation of my device is as follows: The hose E, attached to the compressor or other source of supply, and the stop-cock of the hose attachment closed, the pressure may be at once admitted and the free end of the hose carried to the drill. The rotatable character of the nozzle permits of the stop-cock being screwed onto the rock-drill. The stop-cock can now be opened and the operation of the drill at once proceeded with. Thus the construction illustrated avoids the necessity of a journey to the source of supply, often a matter of much consequence.

The attachment of the hose to the nozzle C is facilitated by the shallow round threads, it being only necessary to enter the end very slightly. Then the mere turning of the hose or nozzle will cause the nozzle to force its way into the hose to any desired distance. The round non-angular character of the threads prevent injury to the hose, which would occur if an angular thread were employed. The hose having been forced upon the shank to some distance beyond the threads the clamp D is slipped over the hose to a point beyond the threads and tightened, so that it compresses the hose securely upon the nozzle. The threads now form a shoulder, which resists any tendency on the part of the nozzle to pull out.

Owing to the curved form of the nozzle C, together with the rotatable character of its connection to the stop-cock, the hose can be led away at any practical angle, thus minimizing the tendency to "kink" and consequently to break.

What I claim as new, and desire to secure by Letters Patent, is—

1. A flexible hose attachment comprising a bent stop-cock nozzle provided with non-angular screw-threads and a clamp adapted to secure the hose upon the nozzle adjacent to and beyond the threads.

2. A flexible hose attachment comprising a curved stop-cock nozzle provided with non-angular screw-threads, a clamp adapted to bind the hose upon the nozzle adjacent to the threads, and suitable coupling devices whereby the parts are connected together and in place.

3. A hose-attaching device comprising a stop-cock having a curved rotatable nozzle at one end provided with round non-angular screw-threads raised above its surface, a compression-clamp adapted to surround the nozzle adjacent to the threads, whereby a flexible hose is secured thereupon, and means adapted to secure the stop-cock to a drill.

PATRICK HENRY REARDON.

Witnesses:
WM. A. HEWITT,
HENRY JACKSON.